United States Patent
Haas Rugel et al.

(10) Patent No.: US 11,424,073 B2
(45) Date of Patent: Aug. 23, 2022

(54) DC LINK CAPACITOR

(71) Applicant: Bayerische Motoren Werke Aktiengesellschaft, Munich (DE)

(72) Inventors: Erick Maximiliano Haas Rugel, Munich (DE); Roman Hamerski, Unterhaching (DE); Sergey Kochetov, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 16/708,060

(22) Filed: Dec. 9, 2019

(65) Prior Publication Data
US 2020/0111610 A1    Apr. 9, 2020

Related U.S. Application Data

(63) Continuation of application No. PCT/EP2018/063976, filed on May 29, 2018.

(30) Foreign Application Priority Data

Jun. 21, 2017  (DE) .................... 10 2017 210 419.8

(51) Int. Cl.
  *H01G 2/04* (2006.01)
  *H01G 4/38* (2006.01)
  (Continued)

(52) U.S. Cl.
  CPC .............. *H01G 2/04* (2013.01); *H01G 4/228* (2013.01); *H01G 4/32* (2013.01); *H01G 4/38* (2013.01); *H01G 2/22* (2013.01)

(58) Field of Classification Search
  CPC .............. H01G 2/04; H01G 4/38; H01G 4/32
  See application file for complete search history.

(56) References Cited

U.S. PATENT DOCUMENTS

| 6,028,779 A | 2/2000 | Sakamoto et al. |
| 6,529,365 B1* | 3/2003 | Liu ...................... H01G 2/065 361/307 |

(Continued)

FOREIGN PATENT DOCUMENTS

| CN | 1108657 C | 5/2003 |
| CN | 203895 270 U | 10/2014 |

(Continued)

OTHER PUBLICATIONS

Chinese Office Action issues in Chinese application No. 201880019147.1 dated Dec. 2, 2020, with English translation (Fifteen (15) pages).

(Continued)

*Primary Examiner* — Eric W Thomas
(74) *Attorney, Agent, or Firm* — Crowell & Moring LLP (57) ABSTRACT

A DC link capacitor includes a plurality of wound capacitors, each having a first connection pole and a second connection pole, a first current-tapping element by which the first connection poles are contacted, and a second current-tapping element by which the second connection poles are contacted. First wound capacitors, of the plurality of wound capacitors, are arranged in a first row and oriented such that the first connection poles are arranged on a first side of the DC link capacitor and the second connection poles are arranged on a second side of the DC link capacitor. Second wound capacitors of the plurality of wound capacitors are arranged in a second row, where the first and second rows are arranged parallel to each other in a common plane, and where the second wound capacitors are oriented such that the first connection poles are arranged on the second side of the DC link capacitor and the second connection poles are arranged on the first side of the DC link capacitor.

18 Claims, 3 Drawing Sheets

(51) Int. Cl.
    *H01G 4/32*    (2006.01)
    *H01G 4/228*   (2006.01)
    *H01G 2/22*    (2006.01)

(56) References Cited

U.S. PATENT DOCUMENTS

| | | | |
|---|---|---|---|
| 2007/0086146 A1* | 4/2007 | Timmerman | H01G 9/155 |
| | | | 361/434 |
| 2011/0149467 A1 | 6/2011 | Azuma et al. | |
| 2014/0286064 A1* | 9/2014 | Kamizuma | H01G 4/224 |
| | | | 363/123 |
| 2015/0256096 A1 | 9/2015 | Nishizawa et al. | |
| 2016/0106011 A1* | 4/2016 | Mizuno | H05K 7/20927 |
| | | | 361/699 |

FOREIGN PATENT DOCUMENTS

| | | |
|---|---|---|
| CN | 104704734 A | 6/2015 |
| EP | 1 788 596 A1 | 5/2007 |
| JP | 9-308267 A | 11/1997 |
| JP | 2004-165309 A | 6/2004 |
| JP | 2009-289967 A | 12/2009 |
| JP | 2011-23496 A | 2/2011 |

OTHER PUBLICATIONS

PCT/EP2018/063976, International Search Report dated Sep. 25, 2018 (Two (2) pages).

German Search Report issued in German counterpart application No. 10 2017 210 419.8 dated May 11, 2018, with Statement of Relevancy (Seven (7) pages).

\* cited by examiner

DC LINK CAPACITOR

CROSS REFERENCE TO RELATED APPLICATIONS

This application is a continuation of PCT International Application No. PCT/EP2018/063976, filed May 29, 2018, which claims priority under 35 U.S.C. § 119 from German Patent Application No. 10 2017 210 419.8, filed Jun. 21, 2017, the entire disclosures of which are herein expressly incorporated by reference.

BACKGROUND AND SUMMARY OF THE INVENTION

The present invention relates to a DC link capacitor.

A DC link capacitor is an important component in the field of power electronics. The design of the DC link capacitor has a substantial impact upon the EMC performance of a device in which said DC link capacitor is installed. Moreover, the design of the DC link capacitor also has an influence upon energy losses associated with ripple currents and upon acoustic noise generated during a switchover operation. Optimization of the DC link capacitor delivers a substantial contribution to the quality of the device in which the latter is installed, and permits the economization of costs for additional measures, such as e.g. filtering, acoustic encapsulation, etc.

DC link capacitors are known from the prior art, wherein a wide variety exists in the design of capacitors, which have various advantages and disadvantages. Common disadvantages include the presence of stray inductances on the capacitor, an uneven distribution of the switching current between individual windings of the DC link capacitor and, in many cases, the existence of unfavorable acoustic properties.

The object of the invention is therefore the provision of an optimized differential winding structure of a DC link capacitor. This is specifically appropriate for motor vehicle and industrial converters.

This object is achieved by a DC link capacitor comprising a plurality of wound capacitors, a first current-tapping element and a second current-tapping element. The plurality of windings and capacitors each comprise a first connection pole and a second connection pole. The first connection poles are contacted by means of the first current-tapping element. The second connection poles are contacted by means of the second current-tapping element. First wound capacitors of the wound capacitors are arranged in a first row, wherein the first wound capacitors are oriented such that the first connection poles are arranged on a first side and the second connection poles are arranged on a second side of the DC link capacitor, the first side and the second side being opposite sides. Moreover, second wound capacitors of the wound capacitors are arranged in a second row, wherein the first row and the second row are arranged parallel to each other in a common plane, wherein the second wound capacitors are oriented such that the first connection poles are arranged on the second side and the second connection poles are arranged on the first side.

A wound capacitor is a capacitor comprising at least one winding. A winding is an element in which a plurality of layers, typically foil elements, are wound together. A current-tapping element is an element by means of which a voltage delivered by the wound capacitors can be tapped off. This means that the wound capacitors can be discharged by means of the current-tapping elements. However, this does not preclude an arrangement whereby the wound capacitors can also be charged by means of the current-tapping elements. Each of the wound capacitors comprises a first and a second connection pole. The connection poles are contacts on the wound capacitors, by means of which the latter are contacted. The connection poles can be identical poles, meaning that the first and the second connection pole are appropriate for both a negative and a positive polarity. Alternatively, the wound capacitors are polarized capacitors, wherein the first connection pole, for example, contacts an anode electrode, and the second connection pole, for example, contacts a cathode electrode.

The first wound capacitors are arranged in a row. This means that the first wound capacitors are arranged adjacently to one another. Specifically, the first wound capacitors are thus arranged in a straight line. The same applies in an identical manner to the second wound capacitors. The first row of first wound capacitors and the second row of second wound capacitors are thus arranged parallel to each other. The first wound capacitors and the second wound capacitors are thus specifically arranged directly adjacently to each other. Such an arrangement of first and second wound capacitors comprises two sides. A first side, which can also be considered as an upper side, and a second side, which can also be considered as an underside. The connection poles of the wound capacitors are arranged on the first and the second side of the wound capacitors. Accordingly, on each side, a row of first connection poles is arranged next to a row of second connection poles.

As all the wound capacitors can be discharged or charged by means of a common first current-tapping element and a common second current-tapping element, an opposing current flux is generated in the wound capacitors of the first and the second row upon the charging or discharging of the DC link capacitor, and thus of the wound capacitors. By such an arrangement of wound capacitors, it is achieved that electric fields associated with the discharging of the DC link capacitor virtually cancel each other out. Thus, inter alia, exceptionally good electromagnetic compatibility is achieved. At the same time, a current flux is evenly distributed between all the wound capacitors, thereby reducing ohmic losses. Moreover, improved acoustic properties are achieved, as the first wound capacitors and the second wound capacitors conduct a current in different directions during the discharging of the DC link capacitor.

It is advantageous if the first current-tapping element comprises a plate-type first subregion which, on the first side, lies in contact with the first connection poles of the first wound capacitors, and a second subregion which, on the second side, lies in contact with the first connection poles of the second wound capacitors. Alternatively or additionally, it is advantageous if the second current-tapping element comprises a plate-type third subregion which, on the first side, lies in contact with the second connection poles of the second wound capacitors, and a fourth plate-type subregion which, on the second side, lies in contact with the second connection poles of the first wound capacitors. By means of such plate-type subregions, a particularly uniform current flux is achieved. As a result, firstly, the first current-tapping elements can be configured to an exceptionally compact design and, secondly, localized voltage peaks or spikes in the current flux can be prevented, which might result in unwanted EMC emissions. Specifically, the first to fourth subregions are arranged parallel to one another. Accordingly, by means of the respectively mutually adjoining subregions, an inverse current flux is achieved, whereby the resulting electric fields can cancel each other out.

It is also advantageous if the first subregion of the first current-tapping element, in the region of the second connection poles of the second wound capacitors, incorporates through openings, in order to permit contacting between the second connection poles of the second wound capacitors and the third subregion of the second current-tapping element. Alternatively, or additionally, it is advantageous if the second subregion of the first current-tapping element, in the region of the second connection poles of the first wound capacitors, incorporates through openings, in order to permit contacting between the second connection poles of the first wound capacitors and the fourth subregion of the second current-tapping element. Exceptionally simple contacting of the wound capacitors is thus permitted, wherein inverse current fluxes in the DC link capacitor, resulting in the mutual cancelling-out of electric fields, are substantially maintained.

It is also advantageous if the first current-tapping element comprises a plate-type first connection region, which connects the first subregion to the second subregion, and the second current-tapping element comprises a plate-type second connection region, which connects the third subregion to the fourth subregion, wherein the first connection region is arranged parallel to the second connection region. The first connection region and the second connection region are specifically arranged on a common side of the wound capacitors. Accordingly, it is also ensured that, in this region, in which the connection regions are arranged, electromagnetic fields are reduced by an inverse current flux.

It is also advantageous if the first subregion is arranged parallel to the third subregion, and the second subregion is arranged parallel to the fourth subregion, wherein the first subregion, the second subregion and the first connection region of the first current-tapping element are arranged between the second current-tapping element and the wound capacitors. In other words, this means that the first current-tapping element is encompassed by the second current-tapping element. The first current-tapping element thus essentially assumes a U-shape. The second current-tapping element also essentially assumes a U-shape, wherein the U constituted by the first current-tapping element lies within the U constituted by the second current-tapping element. This simultaneously permits an attachment of the wound capacitors and the contacting of the wound capacitors wherein, simultaneously, electric fields generated on all sides of the wound capacitors are minimized.

It is further advantageous if the first subregion of the first current-tapping element and the third subregion of the second current-tapping element extend over all the connection poles arranged on the first side. Alternatively or additionally, it is advantageous if the second subregion of the first current-tapping element and the fourth sub-region of the second current-tapping element extend over all the connection poles arranged on the second side. It is specifically advantageous if the first subregion of the first current-tapping element and the third subregion of the second current-tapping element cover an identical region on the first side of the wound capacitors. The same applies in a corresponding manner to the second subregion of the first current-tapping element and the fourth subregion of the second current-tapping element. On the grounds that, by this arrangement, there is no region in which only one of the current-tapping elements is present, electric fields can be fully compensated by inverse current fluxes.

It is also advantageous if each of the wound capacitors comprises two inversely wound turns. An electric field generated by the individual wound capacitors is also minimized accordingly.

It is further advantageous if each of the wound capacitors respectively comprises two first connection poles and two second connection poles. In this manner, regions having high current densities can be reduced.

It is also advantageous if the first current-tapping element and the second current-tapping element respectively comprise an infeed region, wherein the infeed regions are configured in a mutually parallel arrangement. It is specifically advantageous if the infeed regions simultaneously function as retaining elements. Accordingly, any resulting electric field at the periphery of the DC link capacitor can also be minimized.

It is moreover advantageous if the first wound capacitors, in the direction of a vertical axis which is oriented between the first connection poles and the second connection poles of the first wound capacitors, are arranged with an offset in relation to the second wound capacitors. Alternatively or additionally, it is advantageous if the first connection poles are of a different length to the second connection poles. In this manner, it is possible for the connecting poles to contact the first current-tapping element and the second current-tapping element on different planes.

Further details, characteristics and advantages of the invention proceed from the following description and the figures. In the figures:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
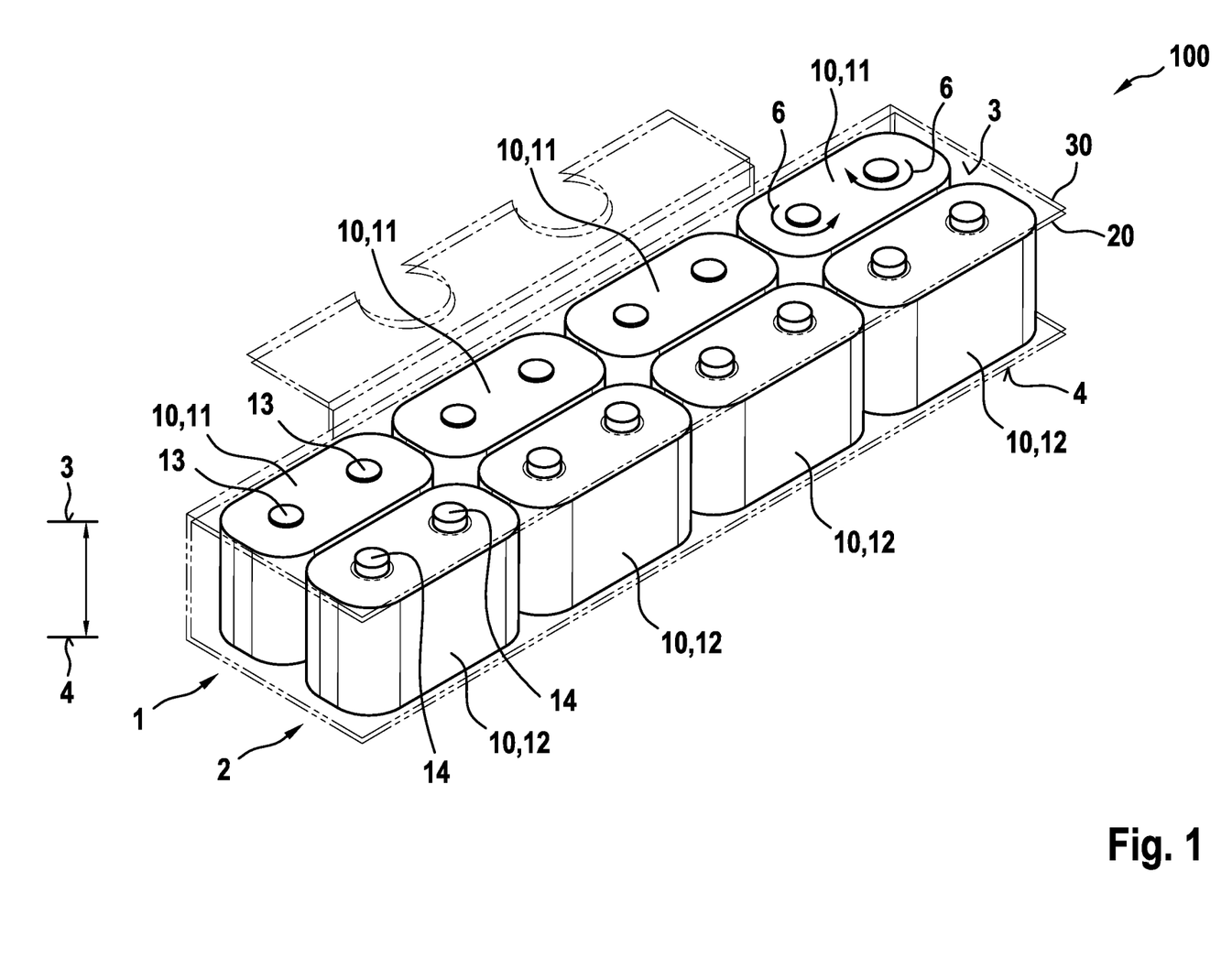
FIG. 1 shows a DC link capacitor according to one form of embodiment of the invention.

FIG. 1 shows a DC link capacitor 100 according to one form of embodiment of the invention. The DC link capacitor 100 comprises a plurality of wound capacitors 10. The DC link capacitor 100 represented in FIG. 1 comprises eight wound capacitors 10.

Each of the wound capacitors 10 comprises two first connection poles 13 and two second connection poles 14. The first connection poles 13 of a wound capacitor 10 can be considered as a common connection pole. The same applies to the second connection poles 14 of an individual wound capacitor 10. In the interior of each of the wound capacitors 10, two inversely wound turns are arranged. This is indicated by the arrows 6 in FIG. 1. By the inverse winding of the two turns in an individual wound capacitor 10, a resulting electromagnetic field associated with the charging or discharging of the respective wound capacitor 10 is minimized.

The eight wound capacitors 10 are subdivided into first wound capacitors 11 and second wound capacitors 12.

The first wound capacitors 11, in this form of embodiment four of the wound capacitors 10, are arranged in a first row 1. The first wound capacitors 11 are arranged such that the first connection poles 13 thereof lie on a first side 3 of the DC link capacitor 100. In FIG. 1, the first side 3 is an upper side of the DC link capacitor 100, and the first connection poles 13 of the first wound capacitors 11 are thus upwardly arranged. All the first connection poles 13 of the first wound capacitors 11 are arranged on a notional straight line.

The second connection poles 14 of the first wound capacitors 11 are arranged on a second side 4 of the DC link capacitor 100, which lies opposite the first side 3. In FIG. 1, the second side 4 is a lower side of the DC link capacitor 100, and the second connection poles 14 of the first wound capacitors 11 are thus downwardly arranged. The second connection poles 14 of the first wound capacitors 11 are also arranged on a notional straight line.

In FIG. 1, the first side 3 is an upper side of the first wound capacitors 11. Consequently, in the view of the DC link capacitor 100 represented in FIG. 1, only the first connection poles 13 of the first wound capacitors 11 are visible, as the second connection poles 14 are arranged on the underside, which is not represented.

The second wound capacitors 12, in this form of embodiment four of the wound capacitors 10, are arranged in a second row 2. The second wound capacitors 12 are arranged such that the second connection poles 14 thereof lie on the first side 3 of the DC link capacitor 100. In FIG. 1, the first side 3 is the upper side of the DC link capacitor 100, and the second connection poles 14 of the second wound capacitors 12 are thus upwardly arranged. All the second connection poles 14 of the second wound capacitors 12 are arranged on a notional straight line.

The first connection poles 13 of the second wound capacitors 12 are arranged on the second side 4 of the DC link capacitor 100. In FIG. 1, the second side 4 is the lower side of the DC link capacitor 100, and the first connection poles 13 of the second wound capacitors 12 are thus downwardly arranged. The first connection poles 13 of the second wound capacitors 12 are also arranged on a notional straight line.

Consequently, in the view of the DC link capacitor 100 represented in FIG. 1, only the second connection poles 14 of the second wound capacitors 12 are visible, as the first connection poles 13 are arranged on the underside, which is not represented.

The first row 1 comprised of first wound capacitors 11 and the second row 2 comprised of second wound capacitors 12 are arranged parallel to each other in a common plane. In each case, one second wound capacitor 12 is arranged next to one first wound capacitor 11. Accordingly, all the connection poles 13, 14 arranged on the first side 3 lie in a common plane, and all the connection poles 13, 14 arranged on the second side 4 lie in a common plane.

If the DC link capacitor 100 is to be charged, a first voltage potential is applied to all the first connection poles 13 and a second potential is applied to all the second connection poles 14. In this manner, a potential is stored in the wound capacitors 10 which corresponds to a potential difference between the first potential and the second potential. In order to permit such charging, or a subsequent discharging of the wound capacitors 10, the DC link capacitor 100 comprises a first current-tapping element 20 and a second current-tapping element 30.

The first current-tapping element 20 lies in contact with the first connection poles 13 of all the wound capacitors 10. The second current-tapping element 30 lies in contact with the second connection poles 14 of all the wound capacitors 10. The wound capacitors 10 can thus be optionally charged or discharged by means of the first current-tapping element 20 and the second current-tapping element 30.

Figure 2:
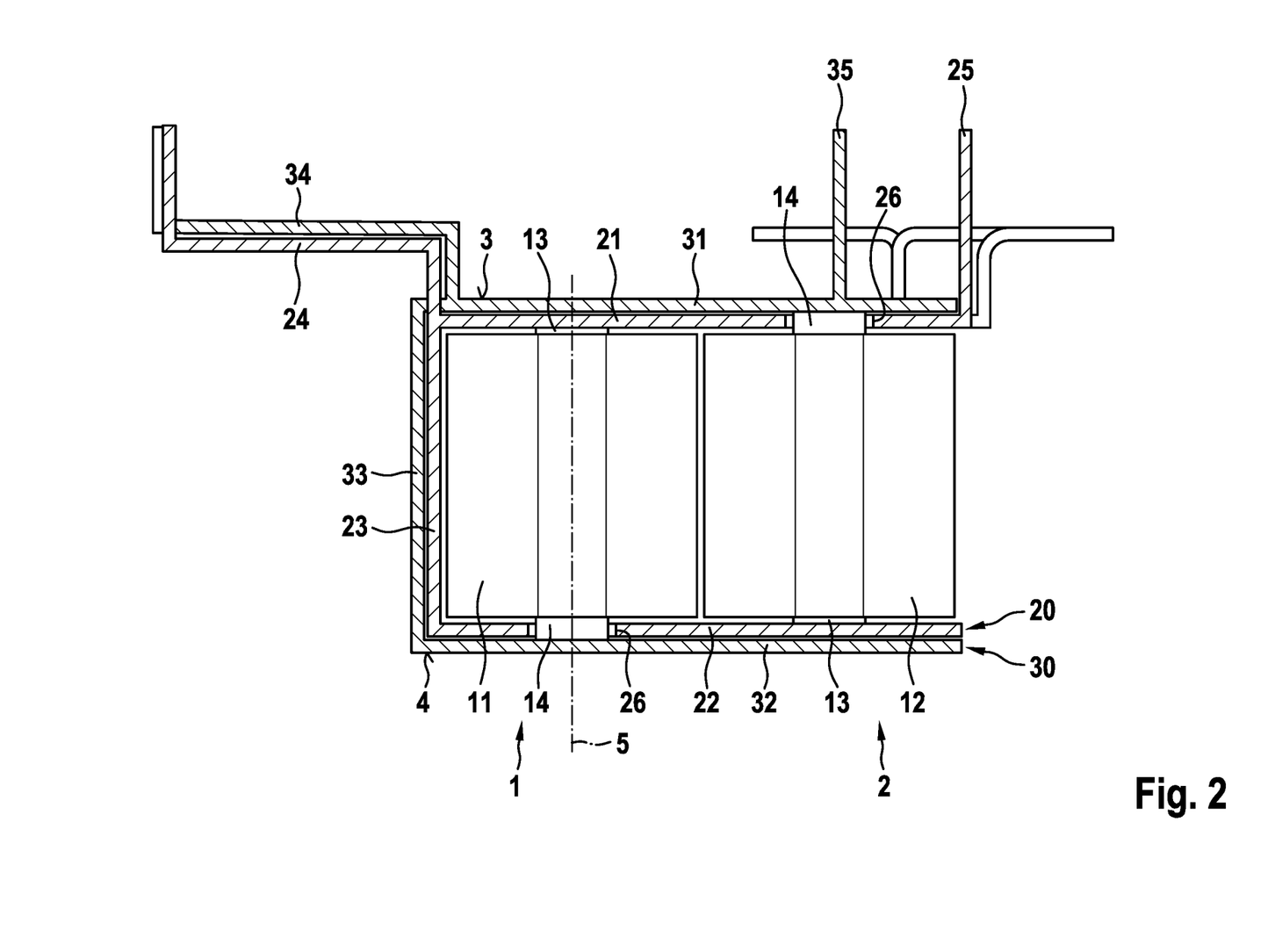
FIG. 2 shows a cross-section of the DC link capacitor represented in FIG. 1.

For the further description of the current-tapping elements 20, 30, reference will be made to FIG. 2. FIG. 2 shows a cross-section of the DC link capacitor 100 represented in FIG. 1. One of the first wound capacitors 11 is represented on the left-hand side of FIG. 2, and one of the second wound capacitors 12 is represented on the right-hand side of FIG. 2.

On the first side 3, and thus at the top of FIG. 2, the first wound capacitor 11 comprises the first connection pole 13. On the second side 4, and thus at the bottom of FIG. 2, the first wound capacitor 11 comprises the second connection pole 14. The first connection poles 13 of all the wound capacitors 10 and the second connection poles 14 of all the wound capacitors 10 are of a differing length. The first connection poles 13 thus have a first length and the second connection poles 14 have a second length. A length of a connection pole 13, 14 is thus defined by the extent to which the respective connection pole extends along a vertical axis 5 which mutually connects the first connection pole 13 and the second connection pole 14 of a wound capacitor 10. In this form of embodiment, the first connection poles 13 are shorter than the second connection poles 14.

As the wound capacitors 10 are arranged such that, on the first side 3, the first connection poles 13 of the first wound capacitors 11 are adjacent to the second connection poles 14 of the second wound capacitors 12, it proceeds that the connection poles 13, 14 adjacently arranged in the lines 1, 2 assume a different vertical extension over a body of the respectively associated wound capacitor 10. In this form of embodiment, the first connection poles 13 are thus short connection poles, and the second connection poles 14 are long connection poles. The same applies in a corresponding manner to the second side of the wound capacitors 10.

The first current-tapping element 20 comprises a plate-type first subregion 21. On the first side 3, this first subregion 21 lies in contact with the first connection poles 13 of the first wound capacitors 11. To this end, the first subregion 21 assumes a planar contact with the first connection poles 13 of the first wound capacitors 11. The first subregion 21 of the first current-tapping element 20 thus extends over all the connection poles 13, 14 arranged on the first side 3. However, as the first subregion 21 assumes a planar contact with the first connection poles 13 of the first wound capacitors 11, the first subregion 21 would also lie in contact with the second connection poles 14 of the second wound capacitors 12. In order to prevent a short-circuit, the first current-tapping element 20, in the first subregion 21, incorporates through openings 26 in the region of the second connection poles 14 of the second wound capacitors 12. The second connection poles 14 of the second wound capacitors 12 extend through these through openings 26. This is possible, as the second connection poles 14 are longer than the first connection poles 13. In order to prevent any establishment of contact between the first subregion 21 of the first current-tapping element 20 and the second connection poles 14 of the second wound capacitors 12, the through openings 26 have an internal diameter which is larger than an external diameter of the second connection poles 14.

The first current-tapping element 20 comprises a plate-type second subregion 22. On the second side 4, this second subregion 22 lies in contact with the first connection poles 13 of the second wound capacitors 12. The second subregion 22 thus assumes a planar contact with the first connection poles 13 of the second wound capacitors 12. The second subregion 22 of the first current-tapping element 20 extends over all the connection poles 13, 14 arranged on the second side 4. As the second subregion 22 assumes a planar contact with first connection poles 13 of the second wound capacitors 12, the second subregion 22 would also lie in contact with the second connection poles 14 of the first wound capacitors 11. In order to prevent a short-circuit, the first current-tapping element 20, in the second subregion 22, incorporates through openings 26 in the region of the second connection poles 14 of the first wound capacitors 11. The second connection poles 14 of the first wound capacitors 11 extend through these through openings 26. This is possible, as the second connection poles 14 are longer than the first connection poles 13. In order to prevent any establishment of contact between the second subregion 22 of the first current-tapping element 20 and the second connection poles 14 of the first wound capacitors 12, the through openings 26 have an internal diameter which is larger than an external diameter of the second connection poles 14.

The first current-tapping element 20 thus lies in contact with all the first connection poles 13 of the wound capacitors 10.

The first current-tapping element 20 further comprises a plate-type first connection region 23, which connects the first subregion 21 to the second subregion 22. This is represented on the left-hand side of FIG. 2, and extends in one direction of the vertical axis 5. In cross-section, the first current-tapping element 20 thus assumes the shape of a U which, originating from the first side 3 and extending to the second side 4, encloses the wound capacitors 10.

The second current-tapping element 30 comprises a plate-type third subregion 31. On the first side 3, i.e. in the upper part of FIG. 2, this lies in contact with the second connection poles 14 of the second wound capacitors 12. The third subregion 31 thus assumes a planar contact with the second connection poles 14 of the second wound capacitors 12. As the first connection poles 13 of the first wound capacitors 11 are shorter than the terminals of the second connection poles 14 of the second wound capacitors 12, the second current-tapping element 30 does not enter into contact with the first connection poles 13 of the first wound capacitors 11 in the third subregion 31. The third subregion 31 can engage with the second connection poles 14 of the second wound capacitors 12, as these extend through the through openings in the first subregion 21 of the first current-tapping element 20. Thus, by means of the through openings, contacting is permitted between the second connection poles 14 of the second wound capacitors 12 and the third subregion 31 of the second current-tapping element 30. The third subregion 31 of the second current-tapping element 30, on the first side 3, thus extends over all the connection poles 13, 14 which are arranged on the first side 3, and covers the same region as the first subregion 21 of the first current-tapping element 20.

The second current-tapping element 30 comprises a plate-type fourth subregion 32. On the second side 4, i.e. in the lower part of FIG. 2, this lies in contact with the second connection poles 14 of the first wound capacitors 11. The fourth subregion 32 thus assumes a planar contact with the second connection poles 14 of the first wound capacitors 11. As the first connection poles 13 of the second wound capacitors 12 are shorter than the second connection poles 14 of the first wound capacitors 11, the second current-tapping element 30 does not enter into contact with the first connection poles 13 of the second wound capacitors 12 in the fourth subregion 32. The fourth subregion 32 can engage with the second connection poles 14 of the first wound capacitors 11, as these extend through the through openings 26 in the second subregion 22 of the first current-tapping element 20. Thus, by means of the through openings 26, contacting is permitted between the second connection poles 14 of the first wound capacitors 11 and the fourth subregion 32 of the second current-tapping element 30. The fourth subregion 32 of the second current-tapping element 30, on the second side 4, thus extends over all the connection poles 13, 14 which are arranged on the second side 4, and covers the same region as the second subregion 22 of the first current-tapping element 20.

The second current-tapping element 30 further comprises a plate-type second connection region 33, which connects the third subregion 31 to the fourth subregion 32. This is represented on the left-hand side of FIG. 2, and extends in one direction of the vertical axis 5. In cross-section, the second current-tapping element 30 thus assumes the shape of a U which, originating from the first side 3 and extending to the second side 4, encloses the wound capacitors 10.

The second current-tapping element 30 thus encompasses the wound capacitors 10 in a similar manner to the first current-tapping element 20. However, the first current-tapping element 20 is also encompassed by the second current-tapping element 30. As the first, second, third and fourth subregions 21, 22, 31, 32 are in planar contact with the connection poles 13, 14 of the wound capacitors 10, the first subregion 21, the third subregion 31, the second subregion 22 and the fourth subregion 32 are arranged parallel to one another. Moreover, the first connection region 23 is arranged parallel to the second connection region 33, wherein the connection regions 23, 33 are oriented perpendicularly to the subregions 21, 22, 31, 32. However, a clearance is provided between the individual regions of the first current-tapping element 20 and the individual regions of the second current-tapping element 30, in order to prevent a short-circuit. Thus, for example, a clearance of 1 mm is provided between the first subregion 21 and the third subregion 31. A clearance of 1 mm, for example, is further provided between the second subregion 22 and the fourth subregion 32. A clearance of 1 mm, for example, is further provided between the first connection region 23 and the second connection region 33.

As the second current-tapping element 30 encompasses the first current-tapping element 20, it proceeds that the first subregion 21, the second subregion 22 and the first connection region 23 are arranged between the second current-tapping element 30 and the wound capacitors 10.

For the external contacting of the current-tapping elements 20, 30, each of said current-tapping elements 20, 30 respectively comprises an infeed region 24, 34. These are represented at the top left of FIG. 2. The first current-tapping element 20 thus comprises a first infeed region 24, and the second current-tapping element 30 comprises a second infeed region 34. The individual infeed regions 24, 34 can comprise a plurality of subsections wherein, in each case, associated subsections of the infeed regions 24, 34 are configured in a mutually parallel arrangement.

The first current-tapping element 20 further comprises a charging terminal 25. This is to be considered as optional, and permits a charging of the wound capacitors 10, in the event that this is not executed by means of the first infeed region 24. In a corresponding manner, the second current-tapping element 30 comprises a second charging terminal 35, which is likewise optional, and which permits a charging of the wound capacitors 10, in the event that this is not executed by means of the second infeed region 34.

Figure 3:
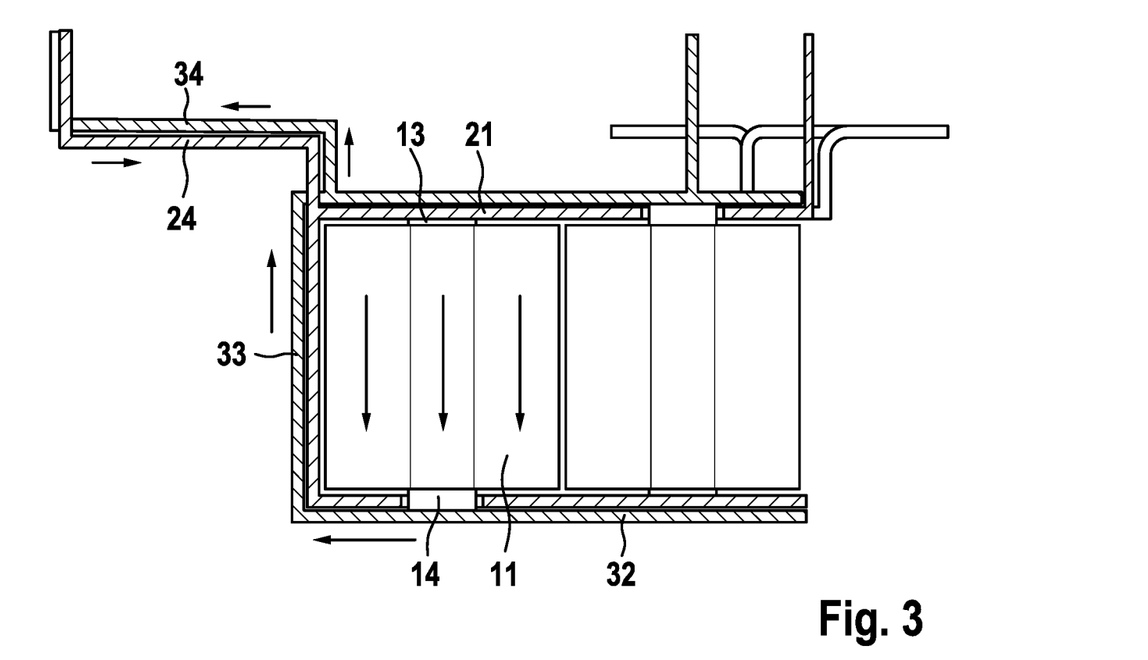
FIG. 3 shows a current flux through the DC link capacitor, in a first wound capacitor.
Figure 4:
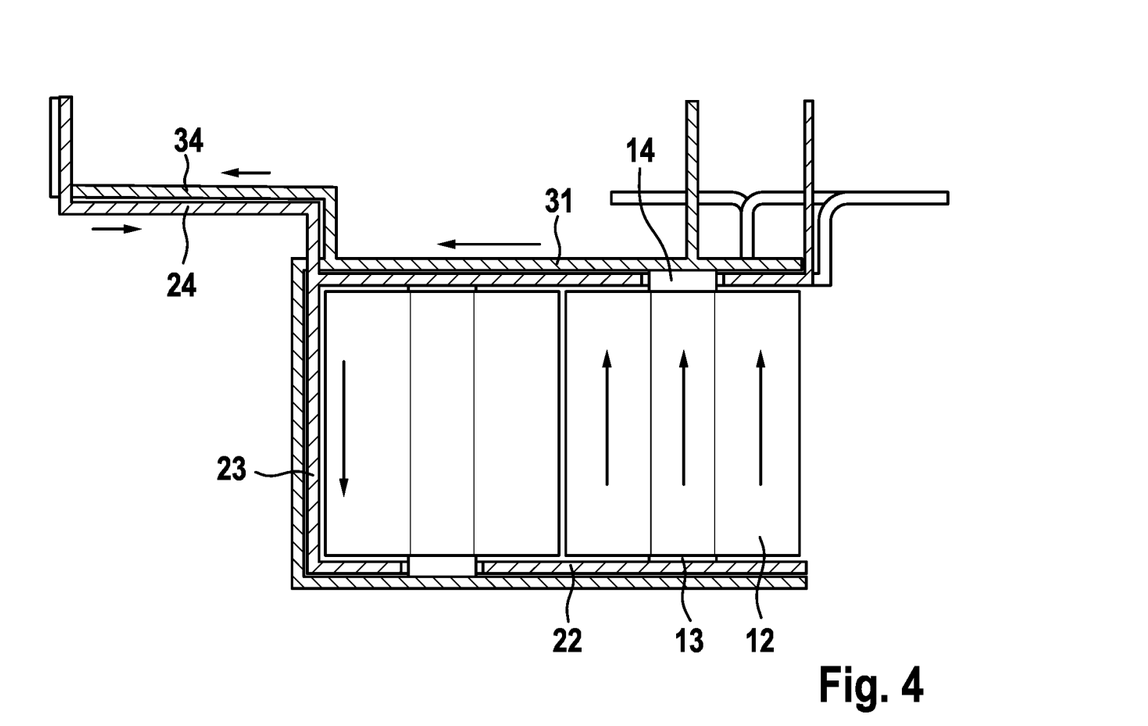
FIG. 4 shows a current flux through the DC link capacitor, in a second wound capacitor.

FIGS. 3 and 4 illustrate the cross-sectional view shown in FIG. 2. FIG. 3 represents a potential current flux through the first wound capacitors 11, and FIG. 4 represents a potential current flux through the second wound capacitors 12. FIG. 3 and FIG. 4 represent the DC link capacitor 100 in the same state.

In FIG. 3, it can be seen that a current flux is routed through the first wound capacitors 11, such that said flux passes sequentially through the first infeed region 24, the first subregion 21, the first connection pole 13 of the first wound capacitors, the first wound capacitors 11, the second connection pole 14 of the first wound capacitors 11, the fourth subregion 32, the second connection region 33, and finally through the second infeed region 34.

With respect to the second wound capacitors 12, the current flux is routed sequentially through the first infeed region 24, the first connection region 23, the second subregion 22, the first connection pole 13 of the second wound capacitors 12, the second wound capacitators 12 the second connection pole 14 of the second wound capacitors 12, the third subregion 31, and finally through the second infeed region 34.

From FIGS. 3 and 4 it can be seen that, in each case, mutually associated regions of the first and second current-tapping elements 20, 30 conduct the current in different directions. At the same time, current is conducted through the first wound capacitors 11 in an inverse direction to the conduction thereof through the second wound capacitors 12. On the grounds that a contiguous and inverse current flux is associated with each current flux in the DC link capacitor 100, unwanted electromagnetic fields are minimized.

The current-tapping elements 20, 30 are specifically HV+ and HV− conductor rails. These are differentially routed above and below the wound capacitors 10. In combination, the current paths via the first wound capacitors 11 and via the second wound capacitors 12 constitute a fully differential power distribution system, which permits a minimum inductance and a uniform current loading of the wound capacitors 10.

It is hereby observed that, in an alternative form of embodiment, the connection poles 13, 14 of the wound capacitors 10 are of equal length. In such a form of embodiment, it is advantageous if the first wound capacitors and the second wound capacitors 12 are arranged with a mutual offset, such that the second connection poles 14 can extend through the through openings of the first current-tapping element 20.

In addition to the above-mentioned disclosure, explicit reference shall also be made to the disclosure of FIGS. 1 to 4.

LIST OF REFERENCE NUMBERS

100 DC link capacitor
1 First row
2 Second row
3 First side
4 Second side
5 Vertical axis
6 Arrows
10 Wound capacitors
11 First wound capacitor
12 Second wound capacitor
13 First connection pole
14 Second connection pole
20 First current-tapping element
21 First subregion
22 Second subregion
23 First connection region
24 First infeed region
25 First charging terminal
26 Through openings
30 Second current-tapping element
31 Third subregion
32 Fourth subregion
33 Second connection region
34 Second infeed region
35 Second charging terminal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A DC link capacitor, comprising:
a plurality of wound capacitors, each having a first connection pole and a second connection pole,
a first current-tapping element by which the first connection poles are contacted; and
a second current-tapping element by which the second connection poles are contacted,
wherein first wound capacitors, of the plurality of wound capacitors, are arranged in a first row, wherein the first wound capacitors are oriented such that all of the first connection poles of the first wound capacitors are arranged on a first side of the DC link capacitor and all of the second connection poles of the first wound capacitors are arranged on a second side of the DC link capacitor, wherein the first side and the second side are opposite sides of the DC link capacitor,
wherein second wound capacitors of the plurality of wound capacitors are arranged in a second row, wherein the first row and the second row are arranged parallel to each other in a common plane, wherein the second wound capacitors are oriented such that all of the first connection poles of the second wound capacitors are arranged on the second side of the DC link capacitor and all of the second connection poles of the second wound capacitors are arranged on the first side of the DC link capacitor, and
wherein the first current-tapping element comprises a plate-type first subregion which, on the first side, lies in contact with the first connection poles of the first wound capacitors, and a plate-type second subregion which, on the second side, lies in contact with the first connection poles of the second wound capacitors.

2. The DC link capacitor according to claim 1, wherein each of the plurality of wound capacitors comprises two inversely wound turns.

3. The DC link capacitor according to claim 1, wherein each of the plurality of wound capacitors respectively comprises two first connection poles and two second connection poles.

4. The DC link capacitor according to claim 1, wherein the first current-tapping element and the second current-tapping element each respectively comprise an infeed region, wherein the infeed regions are configured in a mutually parallel arrangement.

5. A DC link capacitor, comprising:
a plurality of wound capacitors, each having a first connection pole and a second connection pole,
a first current-tapping element by which the first connection poles are contacted; and a second current-tapping element by which the second connection poles are contacted, wherein first wound capacitors, of the plurality of wound capacitors, are arranged in a first row, wherein the first wound capacitors are oriented such that all of the first connection poles of the first wound capacitors are arranged on a first side of the DC link capacitor and all of the second connection poles of the first wound capacitors are arranged on a second side of the DC link capacitor, wherein the first side and the second side are opposite sides of the DC link capacitor, wherein second wound capacitors of the plurality of wound capacitors are arranged in a second row, wherein the first row and the second row are arranged Parallel to each other in a common plane, wherein the second wound capacitors are oriented such that all of the first connection poles of the second wound capacitors are arranged on the second side of the DC link capacitor and all of the second connection poles of the second wound capacitors are arranged on the first side of the DC link capacitor, and wherein the second current-tapping element comprises a plate-type third subregion which, on the first side, lies in contact with the second connection poles of the second wound capacitors, and a fourth plate-type subregion which, on the second side, lies in contact with the second connection poles of the first wound capacitors.

6. The DC link capacitor according to claim 5, wherein the first subregion of the first current-tapping element, in a region of the second connection poles of the second wound capacitors, incorporates through openings to permit contacting between the second connection poles of the second wound capacitors and the third subregion of the second current-tapping element.

7. The DC link capacitor according to claim 6, wherein the second subregion of the first current-tapping element, in the region of the second connection poles of the first wound capacitors, incorporates through openings to permit contacting between the second connection poles of the first wound capacitors and the fourth subregion of the second current-tapping element.

8. The DC link capacitor according to claim 7, wherein the first subregion of the first current-tapping element and the third subregion of the second current-tapping element extend over all of the first connection poles arranged on the first side, and/or
the second subregion of the first current-tapping element and the fourth sub-region of the second current-tapping element extend over all the second connection poles arranged on the second side.

9. The DC link capacitor according to claim 5, wherein the first current-tapping element comprises a plate-type first connection region, which connects the first subregion to the second subregion,
the second current-tapping element comprises a plate-type second connection region, which connects the third subregion to the fourth subregion,
wherein the first connection region is arranged parallel to the second connection region.

10. The DC link capacitor according to claim 9, wherein the first subregion is arranged parallel to the third subregion, and the second subregion is arranged parallel to the fourth subregion, wherein the first subregion, the second subregion and the first connection region of the first current-tapping element are arranged between the second current-tapping element and the plurality wound capacitors.

11. The DC link capacitor according to claim 8, wherein the first subregion of the first current-tapping element and the third subregion of the second current-tapping element extend over all of the first connection poles arranged on the first side, and/or
the second subregion of the first current-tapping element and the fourth sub-region of the second current-tapping element extend over all the second connection poles arranged on the second side.

12. The DC link capacitor according to claim 5, wherein the first subregion of the first current-tapping element and the third subregion of the second current-tapping element extend over all of the first connection poles arranged on the first side, and/or
the second subregion of the first current-tapping element and the fourth sub-region of the second current-tapping element extend over all the second connection poles arranged on the second side.

13. A DC link capacitor, comprising:
a plurality of wound capacitors, each having a first connection pole and a second connection pole,
a first current-tapping element by which the first connection poles are contacted; and
a second current-tapping element by which the second connection poles are contacted,
wherein first wound capacitors, of the plurality of wound capacitors, are arranged in a first row, wherein the first wound capacitors are oriented such that the first connection poles are arranged on a first side of the DC link capacitor and the second connection poles are arranged on a second side of the DC link capacitor, wherein the first side and the second side are opposite sides of the DC link capacitor,
wherein second wound capacitors of the plurality of wound capacitors are arranged in a second row, wherein the first row and the second row are arranged parallel to each other in a common plane, wherein the second wound capacitors are oriented such that the first connection poles are arranged on the second side of the DC link capacitor and the second connection poles are arranged on the first side of the DC link capacitor,
the first current-tapping element comprises a plate-type first subregion which, on the first side, lies in contact with the first connection poles of the first wound capacitors, and a plate-type second subregion which, on the second side, lies in contact with the first connection poles of the second wound capacitors,
the second current-tapping element comprises a plate-type third subregion which, on the first side, lies in contact with the second connection poles of the second wound capacitors, and a fourth plate-type subregion which, on the second side, lies in contact with the second connection poles of the first wound capacitors, and
the first subregion of the first current-tapping element, in a region of the second connection poles of the second wound capacitors, incorporates through openings to permit contacting between the second connection poles of the second wound capacitors and the third subregion of the second current-tapping element.

14. The DC link capacitor according to claim 13, wherein the second subregion of the first current-tapping element, in the region of the second connection poles of the first wound capacitors, incorporates through openings to permit contacting between the second connection poles of the first wound capacitors and the fourth subregion of the second current-tapping element.

15. The DC link capacitor according to claim 14, wherein
the first current-tapping element comprises a plate-type first connection region, which connects the first subregion to the second subregion,
the second current-tapping element comprises a plate-type second connection region, which connects the third subregion to the fourth subregion,
wherein the first connection region is arranged parallel to the second connection region.

16. The DC link capacitor according to claim 15, wherein the first subregion is arranged parallel to the third subregion, and the second subregion is arranged parallel to the fourth subregion, wherein the first subregion, the second subregion and the first connection region of the first current-tapping element are arranged between the second current-tapping element and the plurality wound capacitors.

17. The DC link capacitor according to claim 14, wherein
the first subregion of the first current-tapping element and the third subregion of the second current-tapping element extend over all of the first connection poles arranged on the first side, and/or
the second subregion of the first current-tapping element and the fourth sub-region of the second current-tapping element extend over all the second connection poles arranged on the second side.

18. A DC link capacitor, comprising:
a plurality of wound capacitors, each having a first connection pole and a second connection pole,
a first current-tapping element by which the first connection poles are contacted; and
a second current-tapping element by which the second connection poles are contacted,
wherein first wound capacitors, of the plurality of wound capacitors, are arranged in a first row, wherein the first wound capacitors are oriented such that the first connection poles are arranged on a first side of the DC link capacitor and the second connection poles are arranged on a second side of the DC link capacitor, wherein the first side and the second side are opposite sides of the DC link capacitor,
wherein second wound capacitors of the plurality of wound capacitors are arranged in a second row, wherein the first row and the second row are arranged parallel to each other in a common plane, wherein the second wound capacitors are oriented such that the first connection poles are arranged on the second side of the DC link capacitor and the second connection poles are arranged on the first side of the DC link capacitor, and
wherein the first wound capacitors, in a direction of a vertical axis oriented between the first connection poles and the second connection poles of the first wound capacitors, are arranged with an offset in relation to the second wound capacitors, and/or the first connection poles are of a different length to the second connection poles.

* * * * *